July 20, 1948. R. J. BROWN 2,445,419
NOVELTY WALL BIRD CAGE
Filed Oct. 7, 1944 2 Sheets-Sheet 1

INVENTOR.
Reeve J. Brown
BY
ATTORNEY.

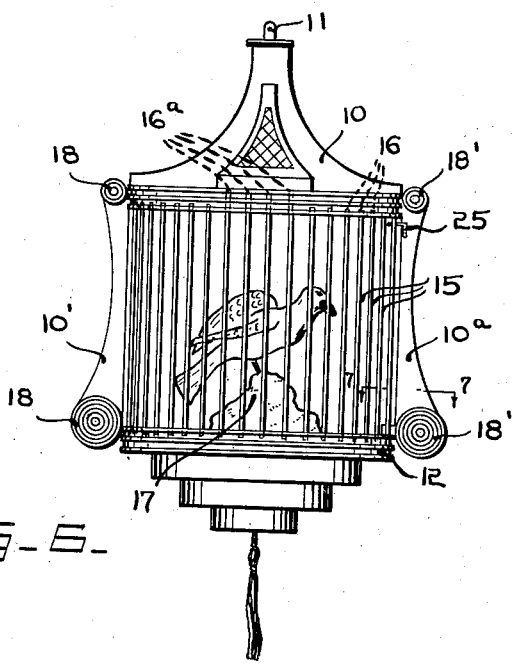
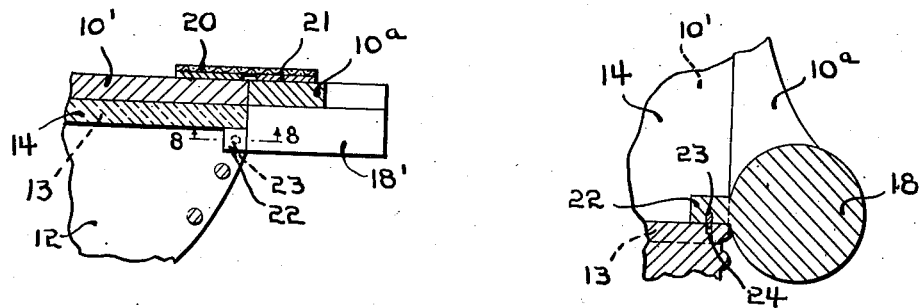

Patented July 20, 1948

2,445,419

UNITED STATES PATENT OFFICE 2,445,419

NOVELTY WALL BIRD CAGE

Reeve J. Brown, Brooklyn, N. Y.

Application October 7, 1944, Serial No. 557,652

1 Claim. (Cl. 41—10)

This invention relates to new and useful improvements in a novelty wall-bird cage.

More specifically, the invention proposes the construction of a novelty wall-bird cage characterized by a semi-circular cage having a flat back wall adapted to rest against the wall and provided with an interior mirror to reflect the semi-circular construction of the cage and give the appearance of a completely circular cage.

Still further the invention proposes the construction of a wall-bird cage having a flat vertical back member with a pair of horizontal superimposed semi-circular members mounted with their straight sides against the back member and having opposed grooves formed in their adjacent faces along their straight sides and in which a mirror is mounted.

Still another object of the invention proposes mounting spaced vertical bars along the curved edge portions of the semi-circular members with a front group of bars being removable to permit an artificial bird to be placed within the cage.

Another object of the invention proposes mounting closure members on the side portions of the back member at the ends of the grooves to close the ends of the grooves and retain the mirror fixedly in position along the vertical back member.

Still another object of the invention proposes a novel means whereby the closure members along one side of the cage may be moved to an inoperative position in a manner to free the mirror to be removed to facilitate cleaning the mirror or to permit the mirror to be interchanged with mirrors with different colors.

It is a further object of this invention to construct a novelty wall-bird cage which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 6 is a front elevational view similar to Fig. 1, but illustrating a modification of the invention.

Fig. 7 is an enlarged partial horizontal sectional view taken on the line 7—7 of Fig. 6.

Fig. 8 is a partial vertical sectional view taken on the line 8—8 of Fig. 7.

Figure 1:
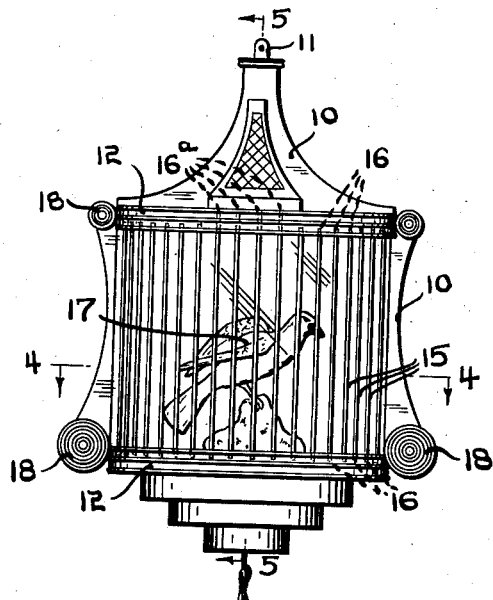
Fig. 1 is a front elevational view of the novelty wall-bird cage constructed in accordance with this invention.

The novelty wall-bird cage, according to this invention, includes a flat vertical back member 10 for resting against the wall and which is provided at its top with a hanger 11 by which it may be supported from a nail or other similar support driven into the wall.

A pair of horizontal superimposed semi-circular members 12 are mounted upon the front face of the flat vertical back member 10. These semi-circular members 12 have their straight sides disposed on and against the back member and attached thereto. The adjacent inner faces of the flat members 12 are formed with opposed grooves 13 extended along their straight sides.

A mirror 14 is mounted across the back member between the superimposed semi-circular members 12. This mirror 14 has its top and bottom edges engaging the grooves 13 to be retained in position against the face of the flat back member 10.

Figure 2:
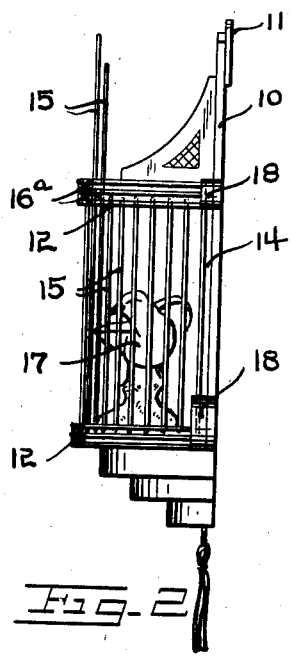
Fig. 2 is an end elevational view of Fig. 1.
Figure 3:
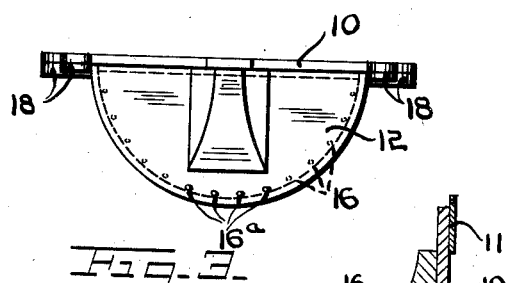
Fig. 3 is a plan view of Fig. 1.
Figure 4:
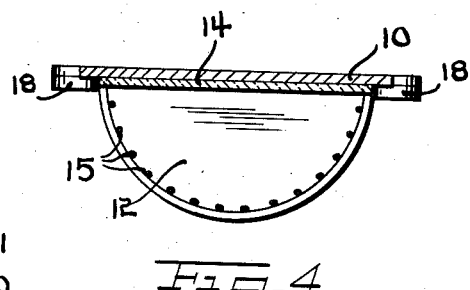
Fig. 4 is a horizontal sectional view taken on the line 4—4 of Fig. 1.
Figure 5:
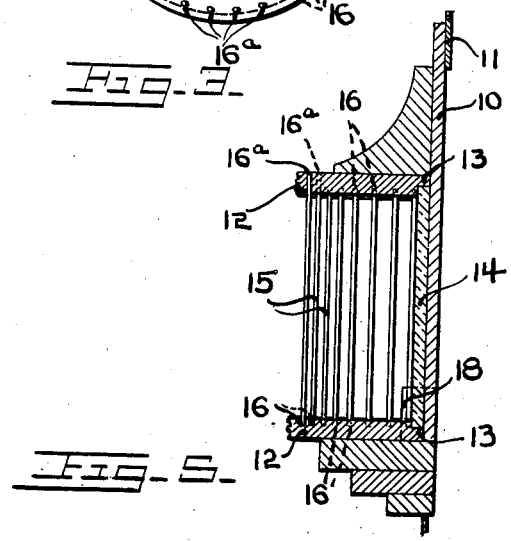
Fig. 5 is a vertical sectional view taken on the line 5—5 of Fig. 1.

Spaced vertical bars 15 are mounted along the curved edge portions of the semi-circular members 12. These bars 15 have their top and bottom ends disposed in openings 16 formed in the adjacent face of the semi-circular members 12. Certain of the openings 16ª which house the top ends of the front group of the bars 15 extend completely through the top semi-circular member 12 permitting this group of bars 15 to be completely removed from the flat members 12. A raised position of certain of these bars 15 is illustrated in full lines in Fig. 2. When these front bars are removed an opening is formed between the remaining bars 15 permitting an artificial bird 17 to be engaged within the cage. This artificial bird is preferably constructed of china, wood, or other similar materials and is gaily colored to represent certain types of birds generally kept as house pets.

A means is provided for closing the ends of the grooves 13 to fixedly retain the mirror 14 in position adjacent the front face of the flat back member 10. To accomplish this the sides of the flat back member 10 extend beyond the edges of the mirror 14 and closure members 18 are mounted on these projected sides at the ends of the grooves 13 and overlie the edges of the mirror. This positioning of the closure members 18 fixedly retains the mirror in position.

The feature of the invention resides in the fact that the bird cage is semi-circular in construction and is adapted to be hung against a flat wall. The mirror 14 positioned on the inside of the cage reflects the forwardly projecting semi-circular construction rearwardly giving the appearance of a completely circular cage.

In the modification of the invention disclosed in Figs. 6 to 8 certain of the closure members 18' along one side of the cage are pivotally supported permitting them to be moved to inoperative positions away from the ends of the grooves 13 freeing the mirror 14 to be removed from the interior of the cage. This removable mounting of the mirror permits it to be easily cleaned and also permits it to be interchanged with mirrors of different colors.

In accomplishing this one side of the back member 10' has a portion 10ª cut therefrom along the adjacent edge of the mirror 14. This side 10ª is pivotally supported in position by means of a strip of cloth 20 having its side portions attached to the adjacent edge portions of the back 10' and the side 10ª by means of mucilage 21.

The closure members 18' are in the nature of discs attached to the face of the side 10ª and means is provided for retaining them in an operative position to engage the edges of the mirror. This means comprises a projection 22 extending from the lowermost closure member or retaining disc 18' and over the edge of the top face of the bottom semi-circular member 12 to engage the mirror. This projection 22 carries a downwardly projecting pin 23 engageable with complementary opening 24 formed in the top face of the bottom semi-circular member 12 for retaining the side 10ª against being pivoted in an inoperative position.

A small leaf spring 25 is mounted upon the front face of the side 10ª and has its free end bearing against the bottom face of the top semi-circular member 12 urging the side 10ª downwards to retain the pin 23 in an engaged position with the opening 24.

To move the side 10ª to an inoperative rearwardly extending position it is merely necessary to urge the side 10ª slightly upwards against the action of the spring 25 to disengage the pin 23 from the opening 24. The flexible nature of the cloth material 20 permits this slight upward movement. In the disengaged position of the pin 23 from the opening 24 the side 10ª may be pivoted rearwards to move the closure members 18' away from their operative position at the ends of the grooves 13 freeing the mirror 14 to be removed from the cage. To return the mirror to its position in the grooves 13 and lock it therein, the above procedure is reversed.

In other respects this form of the invention is similar to that previously shown and like reference numerals identify like parts in each of the several views.

It is to be understood that this novelty wall-bird cage may be in the form of a quadrant of a circle for the base members 12 instead of the semi-circular forms, so that the bird cage may be placed in a corner of a room.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:—

A novelty wall bird cage, comprising a flat vertical back member having side portions, said flat vertical back member being adapted to rest against a wall, a pair of horizontal superimposed semi-circular members mounted with their straight sides on and against said back member and having opposed grooves along their straight sides, a mirror mounted across said back member and having its top and bottom edges engaging said grooves, spaced vertical bars mounted along the curved edge portions of said semi-circular members and a front group of said bars being removable, a plurality of side members, means for hinging said side members to the vertical edges of said side portions of said flat vertical back member, said side members being enlarged vertically and laterally at the lower ends thereof to engage the edge and front faces respectively of said mirror at the corner thereof, and means for pivotally connecting said laterally enlarged portion to the lowermost semi-circular member whereby the mirror can be removed from said back member.

REEVE J. BROWN.

REFERENCES CITED

The following references are of record in the file of this patent:

UNITED STATES PATENTS

| Number | Name | Date |
|---|---|---|
| 186,937 | King | Feb. 6, 1877 |
| 459,216 | Sumner | Sept. 8, 1891 |
| 1,652,096 | Davian | Dec. 6, 1927 |
| 1,770,050 | Thompson | July 8, 1930 |

FOREIGN PATENTS

| Number | Country | Date |
|---|---|---|
| 21,990 | Great Britain | Feb. 25, 1915 |